E. L. BLACK.
SHAFT RELEASER.
APPLICATION FILED JUNE 22, 1911.
1,003,396.
Patented Sept. 12, 1911.
2 SHEETS—SHEET 1.
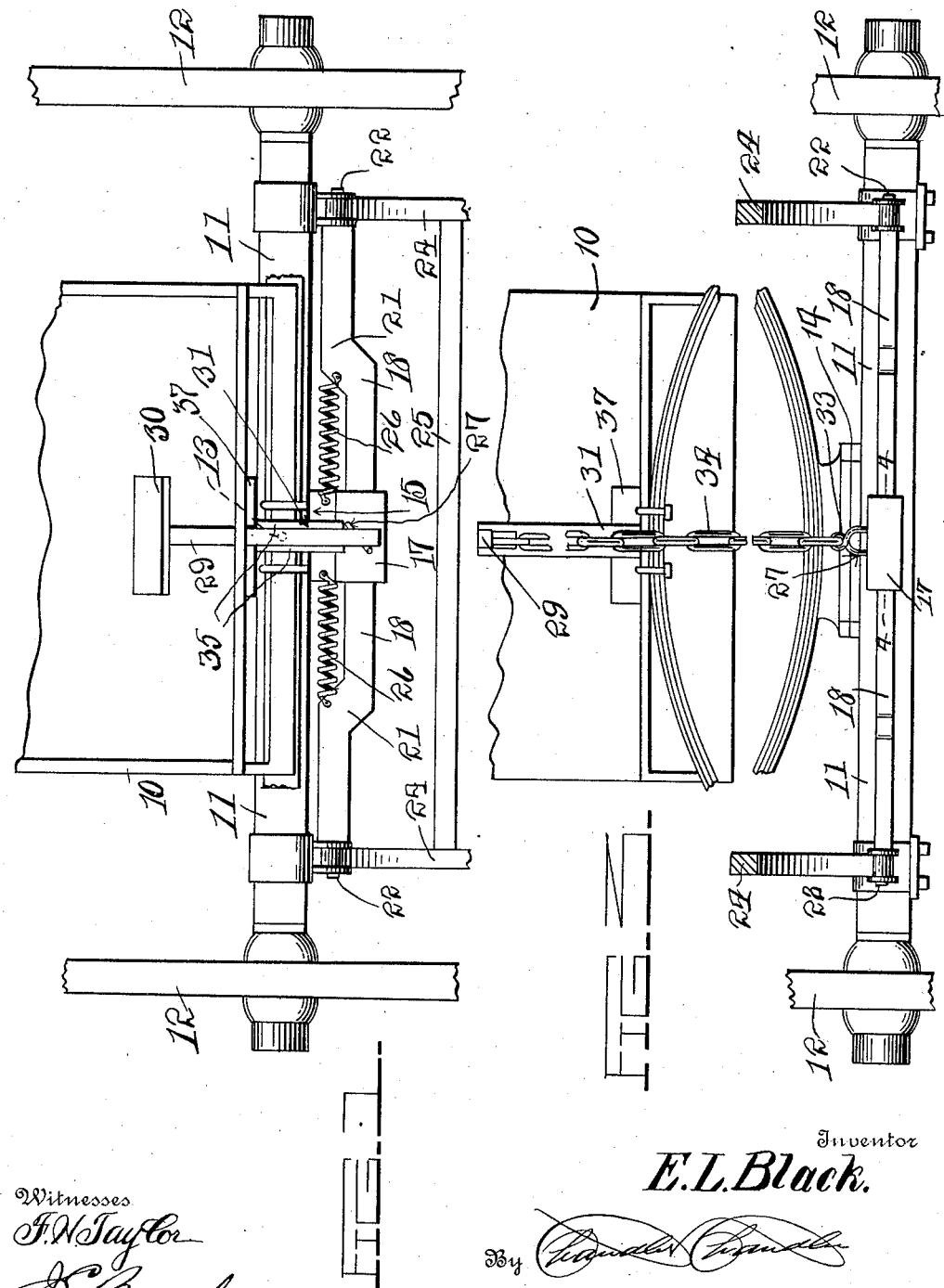
Witnesses
F. N. Taylor
P. Burch.
Inventor
E. L. Black.
By 
Attorneys

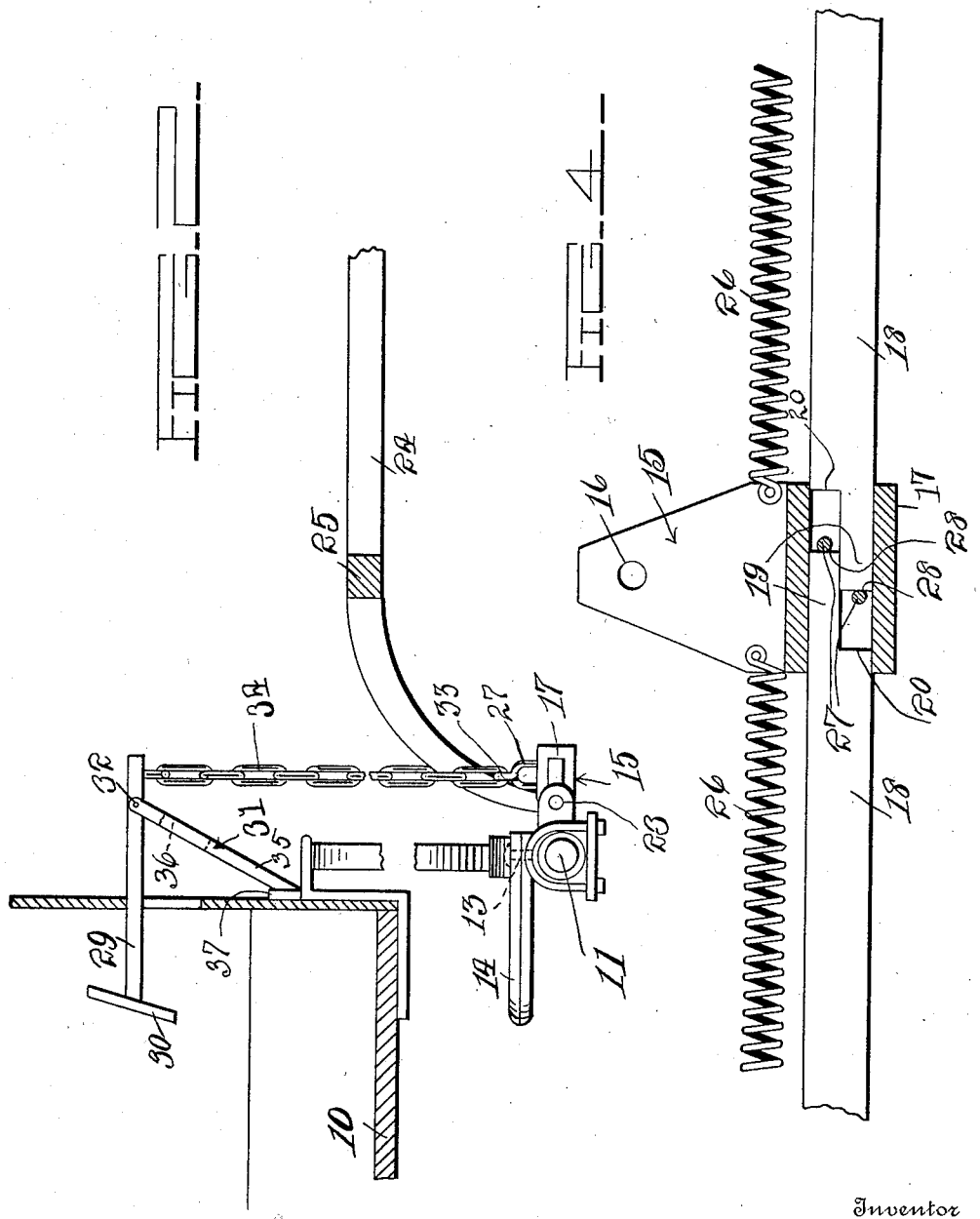

UNITED STATES PATENT OFFICE.

EDWIN L. BLACK, OF HUNTINGDON, TENNESSEE, ASSIGNOR OF ONE-HALF TO JOSEPH T. HESTER, OF HUNTINGDON, TENNESSEE.

SHAFT-RELEASER.

1,003,396. Specification of Letters Patent. Patented Sept. 12, 1911.

Application filed June 22, 1911. Serial No. 634,690.

*To all whom it may concern:*

Be it known that I, EDWIN L. BLACK, a citizen of the United States, residing at Huntingdon, in the county of Carroll, State of Tennessee, have invented certain new and useful Improvements in Shaft-Releasers; and I do hereby declare the following to be a full, clear, and exact description of the invention, such as will enable others skilled in the art to which it appertains to make and use the same.

This invention relates to a shaft releaser for vehicles adapted to permit the horse or animal to be released or freed with the shafts of a buggy or vehicle thus avoiding accidents when the animals become unmanageable.

The specific object of the invention is to provide an improved means by which the shafts may be released from an attached position to the axle of the vehicle from the driver's seat, said means being operable by the feet of the driver and being of extremely simple construction.

With the above and other objects in view the invention consists of certain combinations and arrangements of parts as will be hereinafter more fully described and claimed, it being a still further object to provide a device which will not be likely to get out of working order.

Figure 1 is a top plan view of my improved device applied to a buggy, a fragmentary portion of a body of the buggy or vehicle and shafts being illustrated and the shaft being secured in position. Fig. 2 is a side elevation of the device, the body of the vehicle being shown in section. Fig. 3 is a front elevation thereof. Fig. 4 is a detail sectional view taken on the line 4—4 of Fig. 3.

Referring to the drawings, by numerals, 10 designates the body of the vehicle having the usual front axle 11 and supporting wheels 12 at the ends thereof, a pivot bolt 13 being provided for rotatably supporting the front axle upon the fifth wheel 14.

In the embodiment of my invention, I provide a plate 15 which is provided at its rear end with a vertical opening 16 for receiving the bolt 13 and attaching the plate in position to extend forwardly and the forward end of said plate supports a casing 17 transversely thereof.

The casing 17 is rectangular in cross section and is formed with a similar transverse opening adapted to receive the inner ends of a pair of shaft connecting rods 18 which have their inner ends reduced in width as shown at 19 so that when disposed in overlapped relation, the inner ends of the reduced portions of the said rods will engage the shoulders 20 thus formed to limit the movement of the rods toward each other. The rods 18 are offset rearwardly as shown at 21 approximately centrally of their lengths and their outer portions are formed with reduced extremities 22, preferably of circular cross section to engage in apertures 23 in the rear ends of the shafts 24 which are connected by a transverse bar 25 in the usual manner.

Springs 26 connect opposite sides of the plate 15 adjacent to the casing 17 with the diagonally disposed rear faces of the offset portions 21, said springs being of the usual coiled type and adapted to exert inward pull upon the rods 18 to hold their inner ends in engagement with the transverse opening of the casing 17. A double-pronged pin 27 is adapted to engage in registering openings 28 in the top wall of the casing 17 and the plate 15 diagonally of the casing so as to be engaged by the inner ends of each rod to hold them normally outward for positive engagement of the reduced ends 22 with the shafts and in this position, the springs serve their usual function to hold the rods in such position so as to form a rigid attaching member for the shafts.

In order to release the shafts from the ends of the rods 18, I provide a foot lever 29 having a tread portion 30, said foot lever extending through a slot in the vehicle body 10 in position for operation and being mounted upon a bracket member 31 for pivotal movement as shown at 32, intermediate of its ends and having its forward end connected to an eye 33 formed at the upper end of the pin 27 by means of a chain or other flexible connection 34 so that when the tread portion of the lever is depressed, the forward end of the lever will be raised to lift the prongs of the pin from engagement with the openings 28 in the plate 15 and top wall of the casing 17, thereby permitting the springs 26 to draw the rods in overlapped relation to the inward limit of their movements and thus disengage the outer ends of the rods from the shafts.

For purpose of convenience in the manufacture thereof, the bracket member 31 is constructed of a pair of plates 35 held in spaced relation by an intermediate plate 36 and provided with an attaching plate 37 at their beveled inner ends for securing the bracket member to the wagon body or bed.

From the foregoing description in connection with the accompanying drawings, it will be seen that I have provided a releasing device for the shafts of a vehicle which will be capable of being quickly operated to permit an animal to be released with the shafts should the animal become unmanageable or for other desired purpose and it will be further evident that as the ends of the rods 18 are engaged with the rear ends of the shafts and held in a rigid position, the provision of separate means for supporting the ends of the rods other than the couplings is obviated and thus the construction simplified and rendered capable of being more economically produced.

I claim:

In a shaft releasing device, the combination with a vehicle body having a pivoted front truck and axle and shafts with apertured rear ends; of a plate connected to the pivot of the truck for movement therewith and extending forwardly, a casing upon the plate having a transverse opening, rods having reduced inner ends engaged therein in overlapped relation and limited in their movement by contact with each other, springs connecting the rods with the plate to hold the same normally inward, the outer ends of the rods being adapted for engagement with the apertures of the shafts, a double-pronged pin engaged in openings in the casing and plate to limit the movement of the rods inwardly by contact therewith when engaged with the shaft and an operating lever connected to said pin for raising the same to release the rods for movement inwardly.

In testimony whereof, I affix my signature, in presence of two witnesses.

EDWIN L. BLACK.

Witnesses:
A. W. FOSTER,
CUSTIS ENOCHS.

---

Copies of this patent may be obtained for five cents each, by addressing the "Commissioner of Patents, Washington, D. C."